US 6,582,004 B1

(12) United States Patent
Hamm

(10) Patent No.: US 6,582,004 B1
(45) Date of Patent: Jun. 24, 2003

(54) PIVOTING SEAT ASSEMBLY

(75) Inventor: Nicholas Hamm, Williamsburg, VA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/199,633

(22) Filed: Jul. 19, 2002

(51) Int. Cl.$^7$ ................................................ B60N 2/02
(52) U.S. Cl. .................... 296/65.08; 296/63; 296/65.01; 296/65.13; 297/326; 297/327
(58) Field of Search ............................ 296/63, 65.01, 296/68, 65.06, 65.11, 65.13, 65.08; 297/313, 316, 325, 326, 331, 335, 344.1, 344.11, 411.2

(56) References Cited

U.S. PATENT DOCUMENTS

| | | | |
|---|---|---|---|
| D324,666 S | | 3/1992 | Haag et al. ............... D12/155 |
| 5,516,180 A | * | 5/1996 | Eavenson, Sr. et al. .... 296/68.1 |
| 5,730,495 A | * | 3/1998 | Tuman, II ................. 297/331 |
| 6,371,560 B1 | * | 4/2002 | Fulford et al. ........ 297/411.27 |

OTHER PUBLICATIONS

Deere & Company, Parts Catalog 2351 for 425, 445 and 455 Lawn & Garden Tractors, one page, date of publication—Nov. 2000, published in U.S.A.
Deere & Company, Parts Catalog 2763 for 2020 and 2030 Pro Gator Utility Vehicle, one page, date of publication—Aug. 2001, published in U.S.A.
Deere & Company, Parts Catalog 2387 for 4×2/6×4 Gator, two pages, date of publication—Mar. 2002, published in U.S.A.

* cited by examiner

Primary Examiner—D. Glenn Dayoan
Assistant Examiner—Lori L Coletta

(57) ABSTRACT

An operator seat assembly for use with a utility vehicle is provided. The assembly permits the seat to be adjusted fore and aft between a plurality of positions and includes a tubular hip restraint which is integral to and shiftable with the seat. One leg of the hip restraint serves as a pivot to allow the seat to tilt forwardly from an operative position to a storage position to protect it from the elements when not in use.

4 Claims, 7 Drawing Sheets

PIVOTING SEAT ASSEMBLY

FIELD OF THE INVENTION

The present invention relates to off-road vehicles such as utility vehicles and more specifically to one having a slideable, tiltable operator seat with an integral hip restraint.

BACKGROUND OF THE INVENTION

Off-road vehicles such as utility vehicles are provided with exposed operator stations, that is, they have no cab or other enclosure within which the operator seat and the operator are positioned. Since these vehicles are frequently used on unpaved surfaces, they encounter rough and/or uneven terrain. To help the operator stay correctly positioned in the seat while the vehicle is moving over such a ground or making turns, a hip restraint is provided adjacent to and outboard of the operator seat.

Typically these operator seats are also provided with slide mechanisms that allow them to be adjusted fore and aft to accommodate a wide range of operator sizes and make entry into and exit from the seat easier.

Since these vehicles are typically used outdoors and the seats are exposed to rain, sleet, snow and direct sunlight, it has been desirable to provide them with the ability to swing or be tilted forwardly when not in use. In this way, the seating area doesn't collect rain or snow or become overly heated due to the sun. However, it has not been known to provide a utility vehicle with a seat that is adjustable, has an integral hip restraint that moves with it as it is adjusted and which can also be pivoted forwardly to avoid the elements and protect the seat surface when it is not in use.

SUMMARY OF THE INVENTION

Accordingly, there is provided an operator seat assembly for a utility vehicle that includes an integral hip restraint which is secured to and movable with the operator seat as it is adjusted along its fore and aft spaced apart positions. The restraint is carried outboard of the seat and located relative to the seat to provide restraint against the operator's hip as the vehicle encounters rough ground or executes turns. Since the restraint is mounted to and movable with the seat, there can be provided a smaller restraint, which also minimizes interference between it and the operator as he enters or exits the vehicle. Since a smaller restraint can be used, a tubular restraint structure can be used in place of a padded and/or yieldable restraint structure. Further, there is provided a pivot structure between the seat and restraint which allows the operator seat to be tilted forwardly when not in use to minimize the seat's exposure to sunlight, rain, sleet and/or snow. The pivot structure utilizes a forward transverse leg of the hip restraint for the pivot axis as well as for the connection with the seat base.

DESCRIPTION OF THE PREFERRED EMBODIMENT

Figure 1:
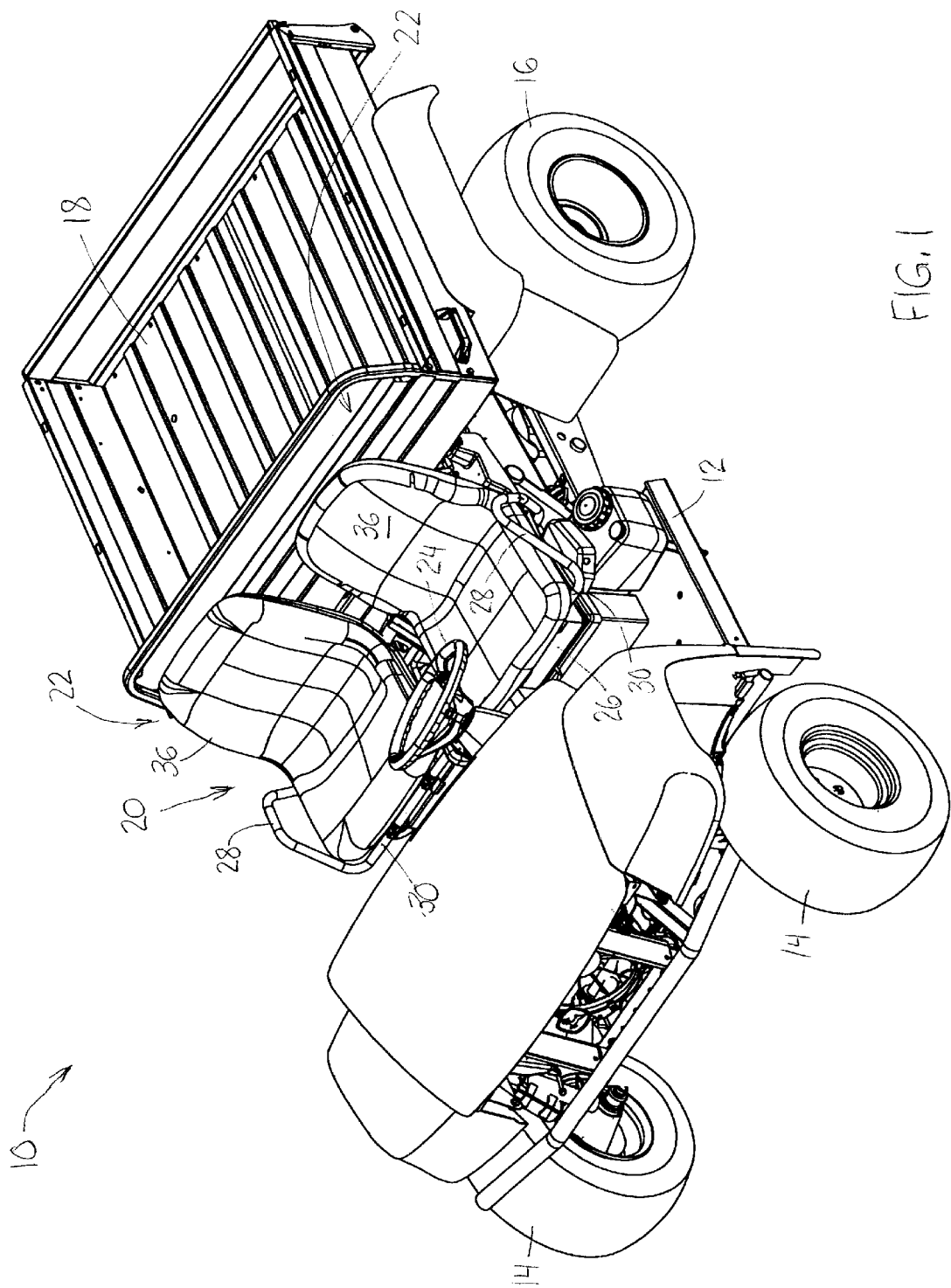
FIG. 1 is a front left elevated perspective view of a utility vehicle equipped with the seat assembly which is the subject of the present invention.

Looking first to FIG. 1, there is illustrated an off-road vehicle commonly referred to as a utility vehicle 10. This vehicle 10 includes a frame 12 supported by front and rear wheels 14 and 16, a power source, unshown, carried on the frame 12 just forwardly of the rear wheels 16, a cargo box 18 at the rear, an operator station 20 including two seat assemblies 22 and a steering wheel 24. The operator station 20 is preferably provided with an operator and passenger seat assembly 22. Since, for the purposes of this disclosure, the two seat assemblies 22 can be comprised of the same essential components, only the operator seat assembly 22 will be discussed in detail.

Figure 2:
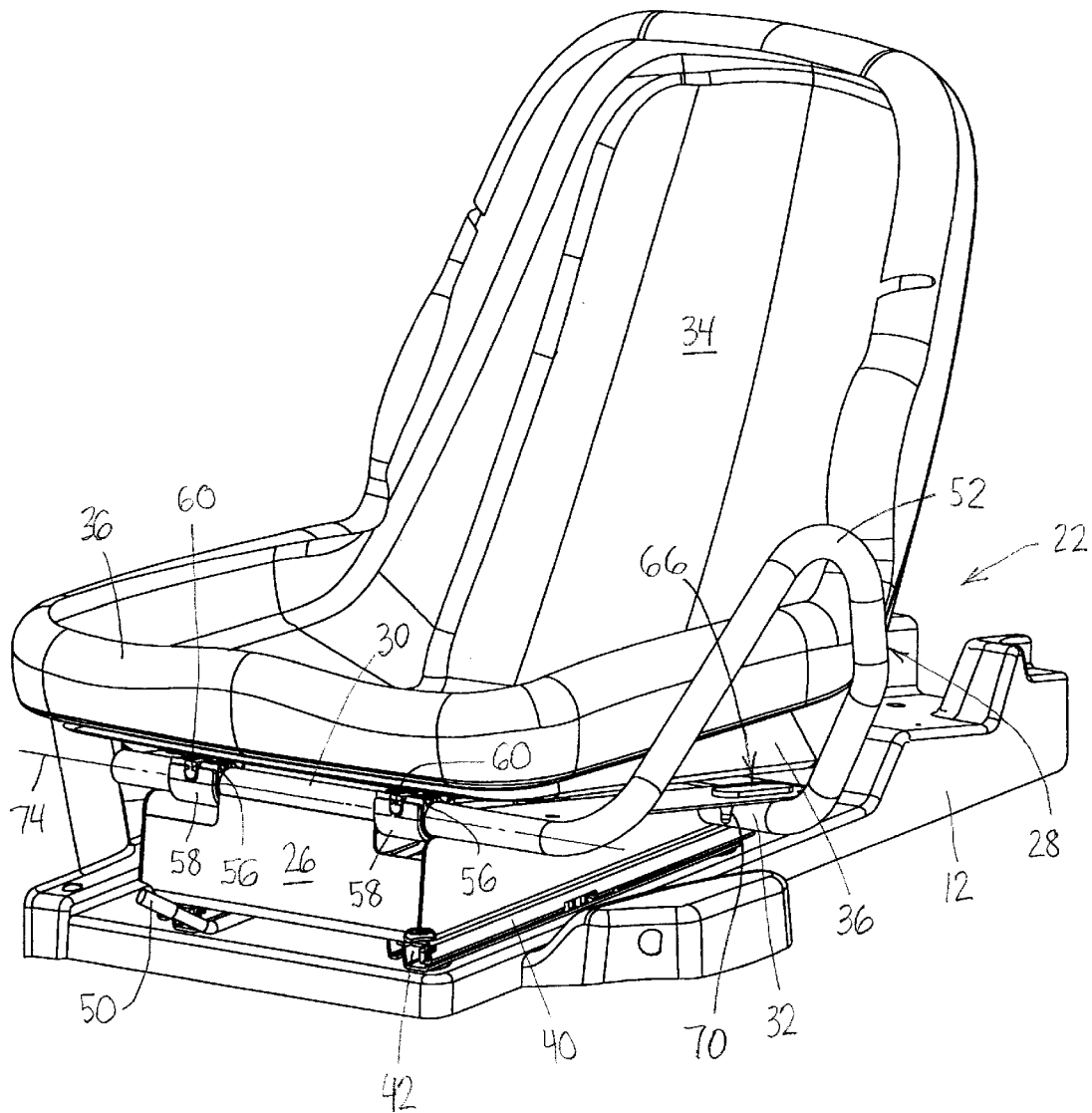
FIG. 2 is an enlarged front left elevated perspective view of the operator seat assembly.

Looking to FIG. 2 as well, it can be seen that the operator seat 22 is supported upon a shiftable base 26. It is also provided with a hip restraint 28 which is preferably formed from a tubular metal bar into a generally bent U-shape with front and rear legs or leg members 30 and 32. The restraint 28 is rigidly coupled with the seat base 26 to be shiftable with it.

Figure 3:
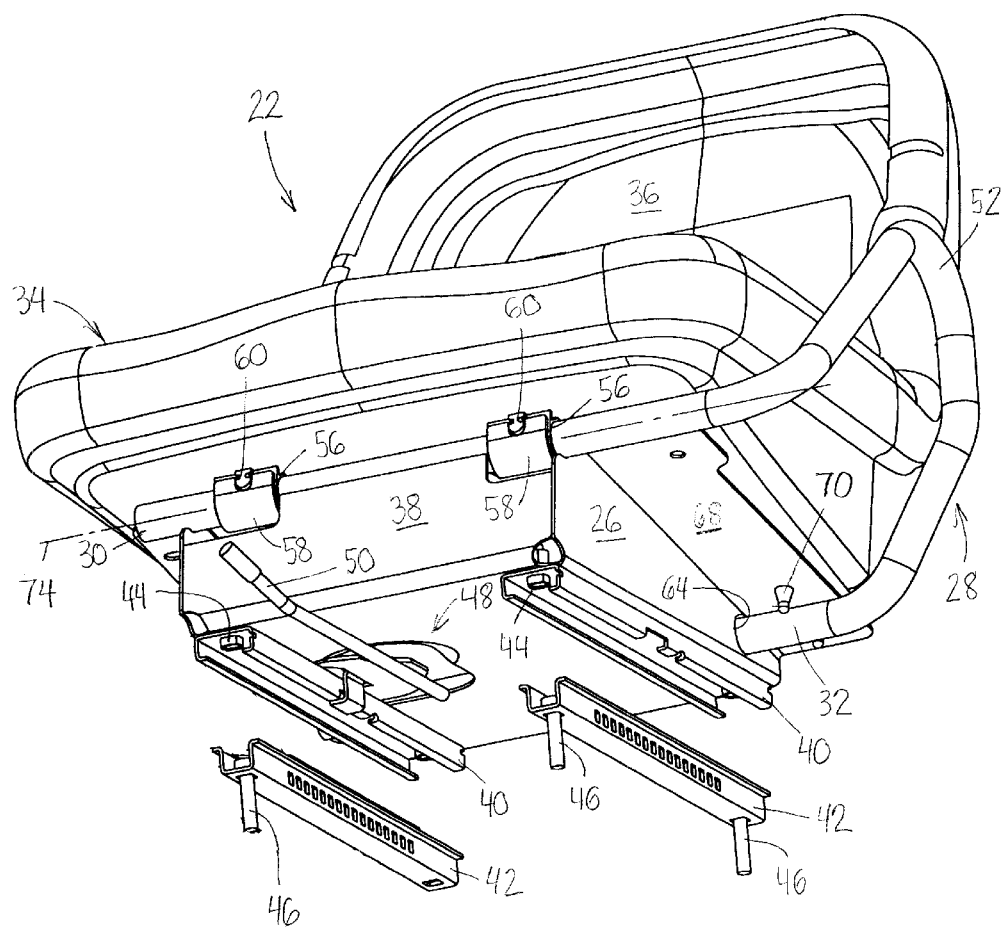
FIG. 3 is an enlarged front perspective view of the underside of the seat, seat base, hip restraint, pivot structure and exploded components of the slide mechanism.

Looking now to FIG. 3, there is illustrated an enlarged front bottom perspective view of the seat assembly 22. The assembly 22 includes the seat 34 which is comprised of a cushion 36 secured to a shell 38. The shell 38 is secured to the base 26 which in turn is slideably carried upon left and right pairs of upper and lower tracks 40 and 42. The upper tracks 40 are secured to the base 26 by threaded fasteners 44 and the lower tracks 42 are secured to the vehicle frame 12 by threaded fasteners 46 as well.

A conventional latching structure 48 including a biased handle 50 is operably connected to the inside pair of upper and lower tracks 40 and 42 to releasably secure them together in any of a plurality of fore and aft adjusted positions.

The hip restraint 28 in the preferred embodiment is formed of tubular metal and includes an upstanding U-shaped mid portion 52 adjacent the outboard edge of the seat 34, generally located where the hip of the operator would be positioned. The restraint 28 includes the fore and aft spaced apart and transversely extending front and back legs 30 and 32 which are secured to the slideable seat assembly 22 for movement therewith.

Figure 4:
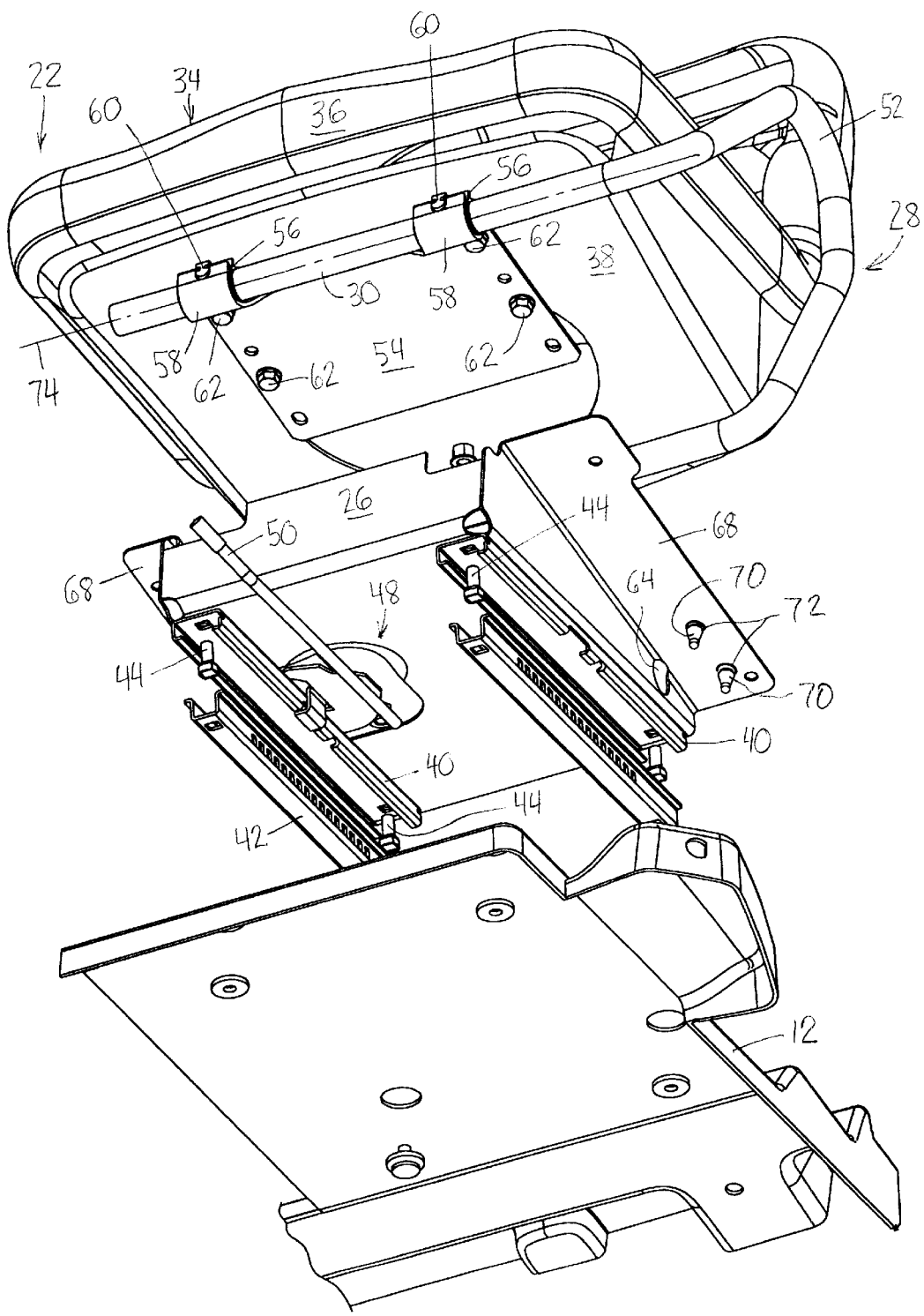
FIG. 4 is a view similar to FIG. 3 with the seat base removed from the seat to reveal the bracket and pivot structure.
Figure 5:
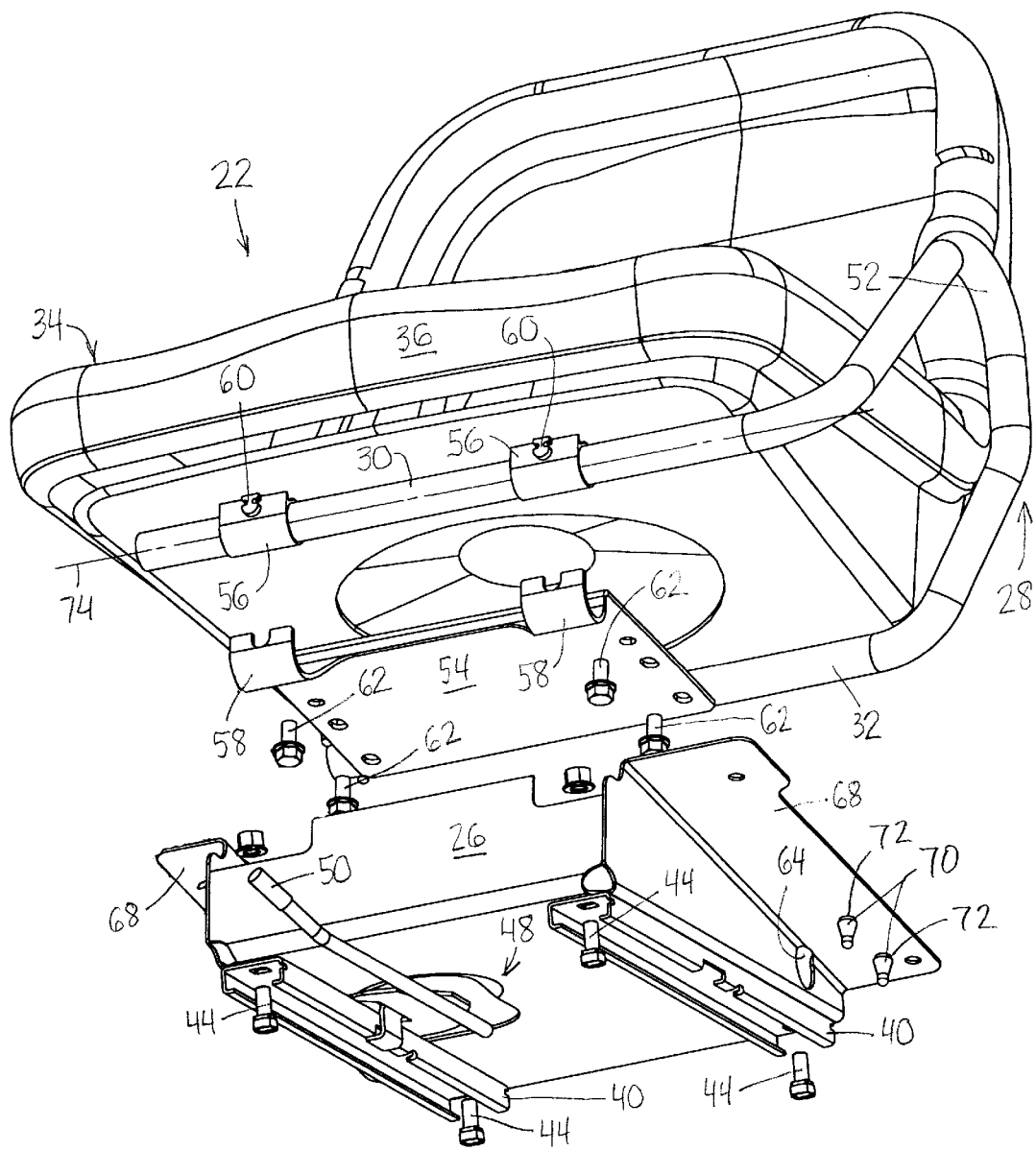
FIG. 5 is a view similar to FIG. 4 with the bracket removed from the seat shell to illustrate the front leg member of the hip restraint, the bushings and the bracket.

Looking as well to FIGS. 4 and 5, it is seen that a bracket structure 54 is provided to secure the front leg 30 of the hip restraint 28 to the seat shell 38 and also secure the seat base 26 to the seat shell 38. Slideably attached to the front leg 30 of the restraint 28 are a pair of bushings 56 that are transversely spaced apart. The bracket 54 includes a pair of U-shaped seats 58 into which the bushings 56 can be receivably positioned. Locating lugs 60 on the bushings 56 are provided to position them within the U-shaped seats 58 provided in the bracket 54. Threaded fasteners 62 are provided to secure the bracket 54 with the seat shell 38 and also secure it to the seat base 26.

Figure 6:
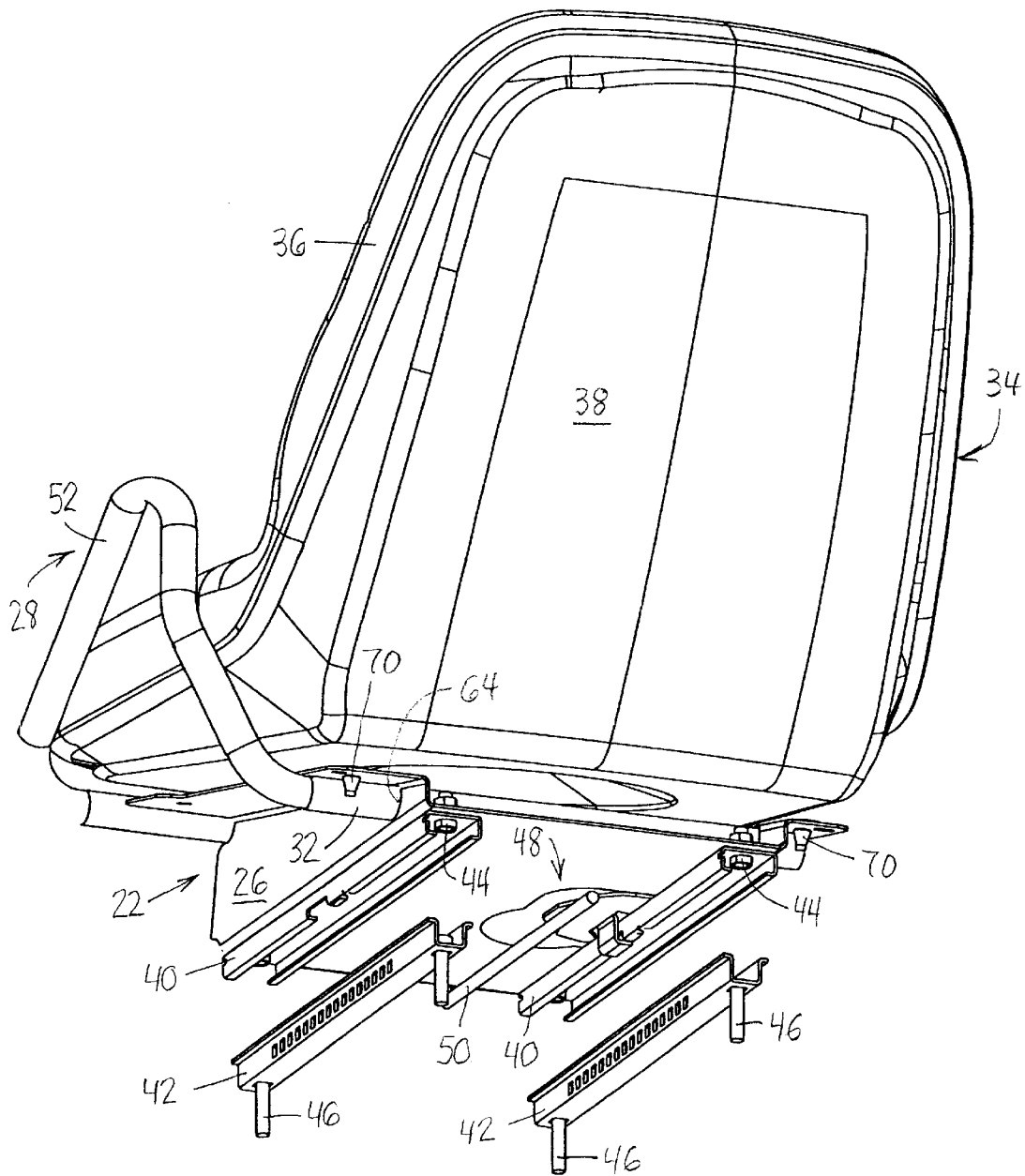
FIG. 6 is a view similar to FIG. 3, but taken from the rear of the seat to illustrate how the rear leg of the hip restraint is mounted with the seat base.

Looking now to FIG. 6, there is illustrated an underside rear perspective view of the rear transverse leg 32 of the hip restraint 28 and its mounting arrangement with the slideable seat base 26. As is also shown in FIGS. 4 and 5; the base 26 is provided with a pair of transversely spaced apart openings 64 through which the rear transverse leg 32 of the restraint 28 is received.

At the rear of the seat base 26, there are provided a pair of laterally spaced apart generally flat strip-like bumpers 66, one each being secured to the top ledge 68 of the seat base 26, See FIGS. 2, 3, 4, 5 and 6. These bumpers 66 include depending tabs 70 which are received in the holes 72 which extend through the ledge 68 to secured them in place on the ledge 68. The bumpers 66 serve as a cushion between the seat shell 38 and ledge 68 when the seat 34 is in its operative position.

The assembly of the hip restraint 28 and pivot structure will now be reviewed in conjunction with FIGS. 4 and 5. Once the bushings 56 have been slid over the front leg member 30 and the rear leg 32 has been inserted into the openings 64 in the seat base 26, the U-shaped bracket seats 58 can be slipped over the bushings 56 on the front leg 30 and the bracket 54 can be fastened to the shell 38. Then the seat base 26 can be secured to the bracket 54 to rigidly connect the hip restraint 28 and seat 34 with the seat base 26. As shown in FIGS. 4, 5 and 6, the bracket structure 54 is attached respectively to the base 26 and shell 38 by screws or similar fasteners.

Figure 8:
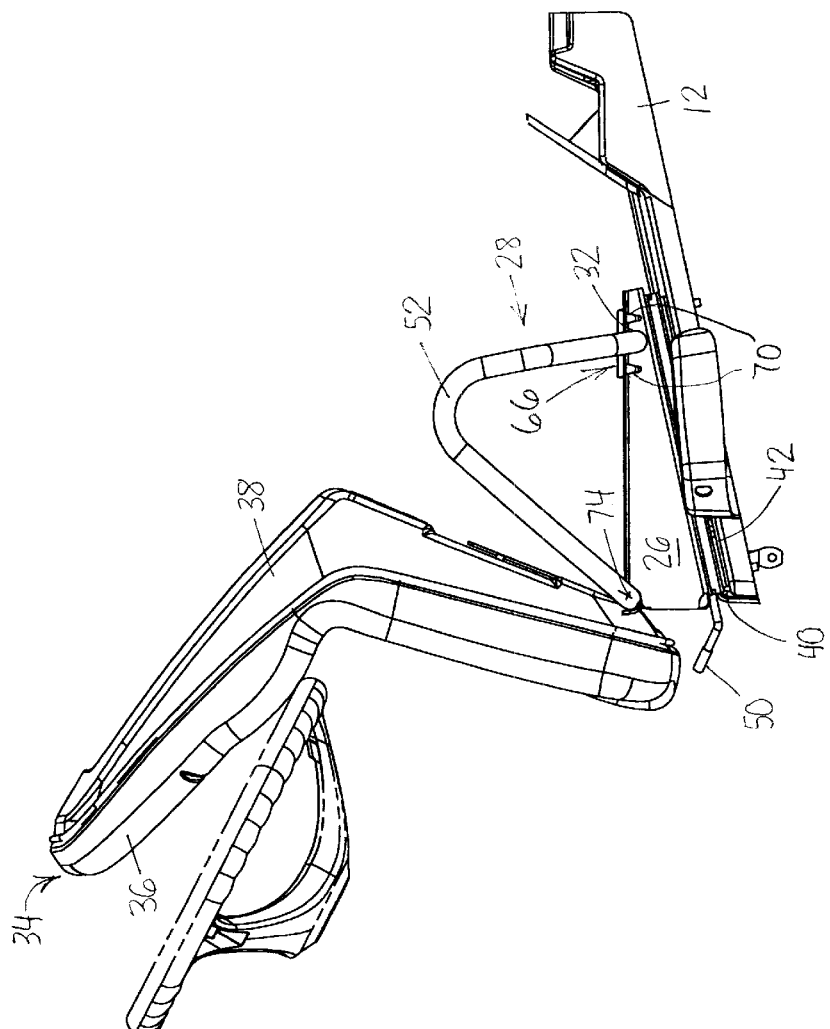
FIG. 8 is a view similar to FIG. 7, but illustrating the seat in its forwardly tilted position.
Figure 7:
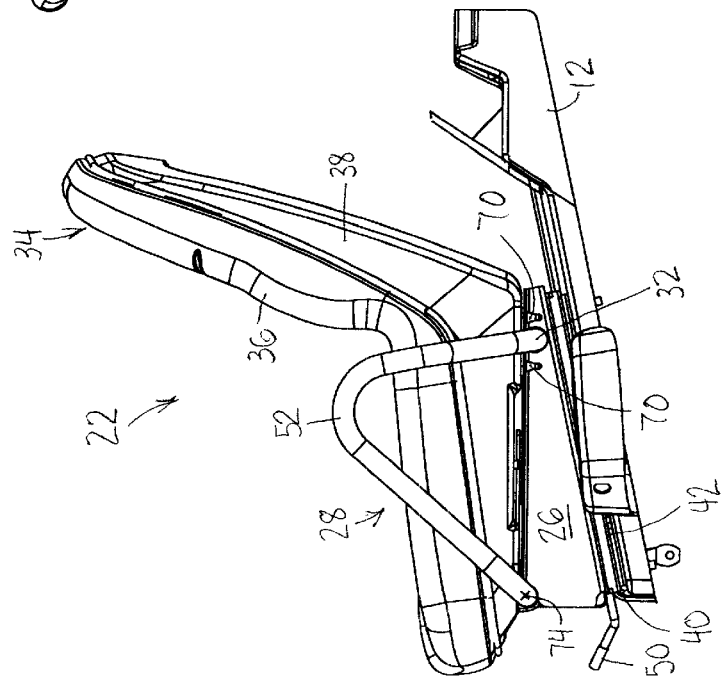
FIG. 7 is a side view of the seat assembly, illustrating the seat in its operative position.

Looking now to FIGS. 7 and 8, there is shown respectively the seat 34 in its rearwardly operative position and its forwardly tilted storage position. To tilt the seat 34 between these two positions, the operator simply pushes on the rear of the seat to swing it forwardly. As it is urged forwardly, the bushings 56 on the front leg 30 slideably rotate about the front leg member 30 to allow the seat 34 to swing forwardly about the laterally extending axis 72 which passes through the front leg member 30. The locating lugs 60 on the bushings 56 secure them within the U-shaped seats 58 of the bracket 54 so that the front leg member 30 can swing within them and the seat 58 of the bracket 54 as the seat 34 is urged forwardly. When the seat 34 is returned to its rearwardly and operative position, the seat shell 38 will settle onto the bumpers 66 carried on the ledge 68 of the base 26.

As discussed, the hip restraint 28 is rigidly secured to the seat assembly 22 for movement therewith as the seat assembly 22 is slideably adjusted on its tracks 40 and 42 between its plurality of fore and aft spaced apart positions. With the hip restraint 28 being located in a fixed position relative to the seat 34, there is provided a consistently positioned restraint against which the operator may brace himself as the vehicle 10 travels across uneven or bumpy terrain and/or executes turns. In this way, the restraint 28 is located at the proper position to prevent sideward shifting of the operator. Further, the restraint 28 can be formed of tubular metal material since it need not be flexible to be moved out of the way as the operator enters and exits the operator station 20.

Having described the preferred embodiment, it will become apparent that various modifications can be made without departing from the scope of the invention as defined in the accompanying claims.

I claim:

1. A seat assembly usable with an off-road vehicle having
   a frame supported by front and rear wheels;
   a power source carried on the frame and operatively connected with the wheels of drivingly powering the vehicle;
   an operator station carried by the frame between the front and rear wheels;
   said seat assembly being carried in the operator station and comprising:
   a seat base,
   a seat member having an outboard side,
   a slide mechanism carried between the base and frame for adjustably shifting the seat member between a plurality of fore and aft spaced apart positions,
   a generally U-shaped hip restraint having transversely extending front and rear leg members with a generally upstanding portion positioned adjacent the outboard side of the seat member, said restraint being operatively coupled with the seat base and shiftable therewith, and
   structure pivotally securing seat member with the front leg member to permit the seat member to be swingably moved between a forwardly tilted position and an operative position, said structure including a bushing attached to the front leg member and a bracket attached to the seat member with the bushing being receivable in a U-shaped seat carried by the bracket.

2. The invention defined in claim 1 wherein the bushing includes a locating lug receivable in a slot of the U-shaped seat of the bracket.

3. The invention defined in claim 1 wherein the rear leg member of the restraint is secured to the base member and the front leg member serves as a pivot axis upon which the seat member is swingable between a forwardly tilted and rearwardly operative position.

4. The invention defined in claim 1 wherein the rear leg member is fixed with the seat base, the front leg member is generally tubular in cross section and swingably receivable in a U-shaped pivot seat which is operatively attached to the seat.

* * * * *